US006765161B1

(12) United States Patent
Wong et al.

(10) Patent No.: US 6,765,161 B1
(45) Date of Patent: Jul. 20, 2004

(54) METHOD AND STRUCTURE FOR A SLUG CATERPILLAR PIEZOELECTRIC LATCHING REFLECTIVE OPTICAL RELAY

(75) Inventors: Marvin Glenn Wong, Woodland Park, CO (US); Arthur Fong, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/412,910

(22) Filed: Apr. 14, 2003

(51) Int. Cl.[7] .............................................. H01H 51/00
(52) U.S. Cl. ..................................................... 200/182
(58) Field of Search ........................ 200/182, 187–189, 200/209–214, 216, 219, 223–236; 310/328, 331, 348, 363; 335/4, 47, 78; 385/19

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,158,118 A * | 6/1979 | Graf ............................ 200/181 |
| 4,200,779 A | 4/1980 | Zakurdaev et al. |

(List continued on next page.)

FOREIGN PATENT DOCUMENTS

| | | |
|---|---|---|
| EP | 0593836 A1 | 10/1992 |
| FR | 2418539 A | 9/1979 |
| FR | 2458138 A1 | 10/1980 |
| FR | 2667396 | 9/1990 |
| JP | 36-18575 | 10/1961 |

(List continued on next page.)

OTHER PUBLICATIONS

Bhedwar, Homi C. et al. "Ceramic Multilayer Package Fabrication." Electronic Materials Handbook, Nov. 1989, pp. 460–469, vol. 1 Packaging, Section 4: Packages.

(List continued on next page.)

Primary Examiner—Michael A. Friedhofer

(57) ABSTRACT

A method and structure for a reflective optical switch. According to the structure, a chamber is housed within a solid material. A plurality of piezoelectric elements within the chamber are coupled to the solid material. A slug within the chamber is operable to be coupled to one or more of the plurality of piezoelectric elements. A liquid metal within the chamber is coupled to the slug. One or more signals of a first one or more optical waveguides coupled to the chamber are operable to be coupled to a second one or more optical waveguides coupled to the chamber. According to the method, one or more of the plurality of piezoelectric elements are actuated, with the actuation of the one or more piezoelectric elements causing the slug coupled to the one or more piezoelectric elements to move from a first number of wetting pads to a second number of wetting pads wherein the first number of wetting pads and the second number of wetting pads are wetted by the liquid metal. The movement of the slug from the first number of wetting pads to the second number of wetting pads breaks a liquid metal surface tension between the slug and the first number of wetting pads and establishes a coupling between the slug and the second number of wetting pads. The movement of the slug and the presence of the liquid metal creates a reflective surface operable to route the one or more signals from the first one or more optical waveguides to the second one or more optical waveguides.

37 Claims, 19 Drawing Sheets

U.S. PATENT DOCUMENTS

| | | | |
|---|---|---|---|
| 4,238,748 A | 12/1980 | Goullin et al. | |
| 4,245,886 A | 1/1981 | Kolodzey et al. | |
| 4,336,570 A | 6/1982 | Brower et al. | |
| 4,419,650 A | 12/1983 | John | |
| 4,434,337 A | 2/1984 | Becker | |
| 4,475,033 A | 10/1984 | Willemsen et al. | |
| 4,505,539 A | 3/1985 | Auracher et al. | |
| 4,582,391 A | 4/1986 | Legrand | |
| 4,628,161 A | 12/1986 | Thackrey | |
| 4,652,710 A | 3/1987 | Karnowsky et al. | |
| 4,657,339 A | 4/1987 | Fick | |
| 4,742,263 A | 5/1988 | Harnden, Jr. et al. | |
| 4,786,130 A | 11/1988 | Georgiou et al. | |
| 4,797,519 A | 1/1989 | Elenbaas | |
| 4,804,932 A | 2/1989 | Akanuma et al. | |
| 4,988,157 A | 1/1991 | Jackel et al. | |
| 5,278,012 A | 1/1994 | Yamanaka et al. | |
| 5,415,026 A | 5/1995 | Ford | |
| 5,502,781 A | 3/1996 | Li et al. | |
| 5,644,676 A | 7/1997 | Blomberg et al. | |
| 5,675,310 A | 10/1997 | Wojnarowski et al. | |
| 5,677,823 A | 10/1997 | Smith | |
| 5,751,074 A | 5/1998 | Prior et al. | |
| 5,751,552 A | 5/1998 | Scanlan et al. | |
| 5,828,799 A | 10/1998 | Donald | |
| 5,841,686 A | 11/1998 | Chu et al. | |
| 5,849,623 A | 12/1998 | Wojnarowski et al. | |
| 5,874,770 A | 2/1999 | Saia et al. | |
| 5,875,531 A | 3/1999 | Nellissen et al. | |
| 5,886,407 A | 3/1999 | Polese et al. | |
| 5,889,325 A | 3/1999 | Uchida et al. | |
| 5,912,606 A | 6/1999 | Nathanson et al. | |
| 5,915,050 A | 6/1999 | Russell et al. | |
| 5,972,737 A | 10/1999 | Polese et al. | |
| 5,994,750 A | 11/1999 | Yagi | |
| 6,021,048 A | 2/2000 | Smith | |
| 6,180,873 B1 | 1/2001 | Bitko | |
| 6,201,682 B1 | 3/2001 | Mooij et al. | |
| 6,207,234 B1 | 3/2001 | Jiang | |
| 6,212,308 B1 | 4/2001 | Donald | |
| 6,225,133 B1 | 5/2001 | Yamamichi et al. | |
| 6,278,541 B1 | 8/2001 | Baker | |
| 6,304,450 B1 | 10/2001 | Dibene, II et al. | |
| 6,320,994 B1 | 11/2001 | Donald et al. | |
| 6,323,447 B1 | 11/2001 | Kondoh et al. | 200/182 |
| 6,351,579 B1 | 2/2002 | Early et al. | |
| 6,356,679 B1 | 3/2002 | Kapany | |
| 6,373,356 B1 | 4/2002 | Gutierrez et al. | 335/47 |
| 6,396,012 B1 | 5/2002 | Bloomfield | |
| 6,396,371 B2 | 5/2002 | Streeter et al. | |
| 6,408,112 B1 | 6/2002 | Bartels | |
| 6,446,317 B1 | 9/2002 | Figueroa et al. | |
| 6,453,086 B1 | 9/2002 | Tarazona | |
| 6,470,106 B2 | 10/2002 | McClelland et al. | |
| 6,487,333 B2 | 11/2002 | Fouquet et al. | |
| 6,501,354 B1 | 12/2002 | Gutierrez et al. | |
| 6,512,322 B1 | 1/2003 | Fong et al. | 310/328 |
| 6,515,404 B1 | 2/2003 | Wong | 310/328 |
| 6,516,504 B2 | 2/2003 | Schaper | |
| 6,559,420 B1 | 5/2003 | Zarev | |
| 6,633,213 B1 | 10/2003 | Dove | |
| 2002/0037128 A1 | 3/2002 | Burger et al. | |
| 2002/0146197 A1 | 10/2002 | Yong | |
| 2002/0150323 A1 | 10/2002 | Nishida et al. | |
| 2002/0168133 A1 | 11/2002 | Saito | |
| 2003/0035611 A1 | 2/2003 | Shi | |

FOREIGN PATENT DOCUMENTS

| | | |
|---|---|---|
| JP | 47-21645 | 10/1972 |
| JP | 63-276838 | 5/1987 |
| JP | 01-294317 | 5/1988 |
| JP | 08-125487 A | 5/1996 |
| JP | 9161640 A | 6/1997 |
| WO | WO 99/46624 A1 | 9/1999 |

OTHER PUBLICATIONS

"Integral Power Resistors for Aluminum Substrate." IBM Technical Disclosure Bulletin, Jun. 1984, US, Jun. 1, 1984, p. 827, vol. 27, No. 1B, TDB–ACC–NO: NB8406827, Cross Reference: 0018–8689–27–1B–827.

Kim, Joonwon et al. "A Micromechanical Switch with Electrostatically Driven Liquid–Metal Droplet." Sensors and Actuators, A: Physical. v 9798, Apr. 1, 2002, 4 pages.

Jonathan Simon, "A Liquid–Filled Microrelay with a Moving Mercury Microdrop" (Sep. 1997) Journal of Microelectromechanical Systems, vol. 6, No. 3, pp. 208–216.

Marvin Glenn Wong, "A Piezoelectrically Actuated Liquid Metal Switch", May 1, 2002, Patent Application 10/137,691, 12 pages of specification, 5 pages of claims, 1 page of abstract, and 10 sheets of drawings (Figs. 1–10).

* cited by examiner

METHOD AND STRUCTURE FOR A SLUG CATERPILLAR PIEZOELECTRIC LATCHING REFLECTIVE OPTICAL RELAY

CROSS REFERENCE TO RELATED APPLICATIONS

This application is related to the following co-pending U.S. Patent Applications, being identified by the below enumerated identifiers and arranged in alphanumerical order, which have the same ownership as the present application and to that extent are related to the present application and which are hereby incorporated by reference:

application 10010448-1, titled "Piezoelectrically Actuated Liquid Metal Switch", filed May 2, 2002 and identified by Ser. No. 10/137,691;

application 10010529-1, "Bending Mode Latching Relay", and having the same filing date as the present application;

application 10010531-1, "High Frequency Bending Mode Latching Relay", and having the same filing date as the present application;

application 10010570-1, titled "Piezoelectrically Actuated Liquid Metal Switch", filed May 2, 2002 and identified by Ser. No. 10/142,076;

application 10010571-1, "High-frequency, Liquid Metal, Latching Relay with Face Contact", and having the same filing date as the present application;

application 10010572-1, "Liquid Metal, Latching Relay with Face Contact", and having the same filing date as the present application;

application 10010573-1, "Insertion Type Liquid Metal Latching Relay", and having the same filing date as the present application;

application 10010617-1, "High-frequency, Liquid Metal, Latching Relay Array", and having the same filing date as the present application;

application 10010618-1, "Insertion Type Liquid Metal Latching Relay Array", and having the same filing date as the present application;

application 10010634-1, "Liquid Metal Optical Relay", and having the same filing date as the present application;

application 10010640-1, titled "A Longitudinal Piezoelectric Optical Latching Relay", filed Oct. 31, 2001 and identified by Ser. No. 09/999,590;

application 10010643-1, "Shear Mode Liquid Metal Switch", and having the same filing date as the present application;

application 10010644-1, "Bending Mode Liquid Metal Switch", and having the same filing date as the present application;

application 10010656-1, titled "A Longitudinal Mode Optical Latching Relay", and having the same filing date as the present application;

application 10010663-1, "Method and Structure for a Pusher-Mode Piezoelectrically Actuated Liquid Metal Switch", and having the same filing date as the present application;

application 10010664-1, "Method and Structure for a Pusher-Mode Piezoelectrically Actuated Liquid Metal Optical Switch", and having the same filing date as the present application;

application 10010790-1, titled "Switch and Production Thereof", filed Dec. 12, 2002 and identified by Ser. No. 10/317,597;

application 10011055-1, "High Frequency Latching Relay with Bending Switch Bar", and having the same filing date as the present application;

application 10011056-1, "Latching Relay with Switch Bar", and having the same filing date as the present application;

application 10011064-1, "High Frequency Push-mode Latching Relay", and having the same filing date as the present application;

application 10011065-1, "Push-mode Latching Relay", and having the same filing date as the present application;

application 10011121-1, "Closed Loop Piezoelectric Pump", and having the same filing date as the present application;

application 10011329-1, titled "Solid Slug Longitudinal Piezoelectric Latching Relay", filed May 2, 2002 and identified by Ser. No. 10/137,692;

application 10011344-1, "Method and Structure for a Slug Pusher-Mode Piezoelectrically Actuated Liquid Metal Switch", and having the same filing date as the present application;

application 10011345-1, "Method and Structure for a Slug Assisted Longitudinal Piezoelectrically Actuated Liquid Metal Optical Switch", and having the same filing date as the present application;

application 10011397-1, "Method and Structure for a Slug Assisted Pusher-Mode Piezoelectrically Actuated Liquid Metal Optical Switch", and having the same filing date as the present application;

application 10011398-1, "Polymeric Liquid Metal Switch", and having the same filing date as the present application;

application 10011410-1, "Polymeric Liquid Metal Optical Switch", and having the same filing date as the present application;

application 10011436-1, "Longitudinal Electromagnetic Latching Optical Relay", and having the same filing date as the present application;

application 10011437-1, "Longitudinal Electromagnetic Latching Relay", and having the same filing date as the present application;

application 10011458-1, "Damped Longitudinal Mode Optical Latching Relay", and having the same filing date as the present application;

application 10011459-1, "Damped Longitudinal Mode Latching Relay", and having the same filing date as the present application;

application 10020013-1, titled "Switch and Method for Producing the Same", filed Dec. 12, 2002 and identified by Ser. No. 10/317,963;

application 10020027-1, titled "Piezoelectric Optical Relay", filed Mar. 28, 2002 and identified by Ser. No. 10/109,309;

application 10020071-1, titled "Electrically Isolated Liquid Metal Micro-Switches for Integrally Shielded Microcircuits", filed Oct. 8, 2002 and identified by Ser. No. 10/266,872;

application 10020073-1, titled "Piezoelectric Optical Demultiplexing Switch", filed Apr. 10, 2002 and identified by Ser. No. 10/119,503;

application 10020162-1, titled "Volume Adjustment Apparatus and Method for Use", filed Dec. 12, 2002 and identified by Ser. No. 10/317,293;

application 10020241-1, "Method and Apparatus for Maintaining a Liquid Metal Switch in a Ready-to-Switch Condition", and having the same filing date as the present application;

application 10020242-1, titled "A Longitudinal Mode Solid Slug Optical Latching Relay", and having the same filing date as the present application;

application 10020473-1, titled "Reflecting Wedge Optical Wavelength Multiplexer/Demultiplexer", and having the same filing date as the present application;

application 10020540-1, "Method and Structure for a Solid Slug Caterpillar Piezoelectric Relay", and having the same filing date as the present application;

application 10020541-1, titled "Method and Structure for a Solid Slug Caterpillar Piezoelectric Optical Relay", and having the same filing date as the present application;

application 10030438-1, "Inserting-finger Liquid Metal Relay", and having the same filing date as the present application;

application 10030440-1, "Wetting Finger Liquid Metal Latching Relay", and having the same filing date as the present application;

application 10030521-1, "Pressure Actuated Optical Latching Relay", and having the same filing date as the present application; and application 10030522-1, "Pressure Actuated Solid Slug Optical Latching Relay", and having the same filing date as the present application.

TECHNICAL FIELD

This invention relates generally to the field of electronic devices and systems, and more specifically to optical switching technology.

BACKGROUND

A relay or switch may be used to change an optical signal from a first state to a second state. In general there may be more than two states. In applications that require a small switch geometry or a large number of switches within a small region, microfabrication techniques may be used to create switches with a small footprint. A microfabricated switch may be used in a variety of applications, such as industrial equipment, telecommunications equipment and control of electromechanical devices such as ink jet printers.

In switching applications, the use of piezoelectric technology may be used to actuate a switch. Piezoelectric materials have several unique characteristics. A piezoelectric material can be made to expand or contract in response to an applied voltage. This is known as the indirect piezoelectric effect. The amount of expansion or contraction, the force generated by the expansion or contraction, and the amount of time between successive contractions are important material properties that influence the application of a piezoelectric material in a particular application. Piezoelectric material also exhibits a direct piezoelectric effect, in which an electric field is generated in response to an applied force. This electric field may be converted to a voltage if contacts are properly coupled to the piezoelectric material. The indirect piezoelectric effect is useful in making or breaking a contact within a switching element, while the direct piezoelectric effect is useful in generating a switching signal in response to an applied force.

SUMMARY

A method and structure for an optical switch is disclosed. According to a structure of the present invention, a chamber is housed within a solid material. A plurality of wetting pads within the chamber are coupled to the solid material, while a plurality of piezoelectric elements within the chamber are also coupled to the solid material. A slug within the chamber is coupled to one or more of the plurality of wetting pads and may be further coupled to one or more of the plurality of piezoelectric elements. The slug moves within the chamber and makes or breaks surface tension connections with one or more of the plurality of wetting pads. A liquid metal within the gas-filled chamber is coupled to the slug, and coupled to the plurality of wetting pads. The liquid metal, such as mercury or a Gallium alloy, acts as a friction-reducing lubricant, and also is operable to provide a surface tension that maintains a connection between the slug and a contact of the plurality of wetting pads.

According to a method of the present invention, one or more of the plurality of piezoelectric elements are actuated, with the actuation of the one or more piezoelectric elements causing the one or more piezoelectric elements to contact the slug and move the slug from a first number of wetting pads to a second number of wetting pads. The first number of wetting pads and the second number of wetting pads are wetted by the liquid metal. The movement of the slug from the first number of wetting pads to the second number of wetting pads breaks a liquid metal surface tension between the slug and the first number of wetting pads and establishes a coupling between the slug and the second number of wetting pads. The position of the slug and the wetting of the slug by the liquid metal enables a reflective surface to be created by the liquid metal. The reflective surface is created at an angle that allows signals to be coupled between the first set of optical waveguides and the second set of optical waveguides. The surface tension of the liquid metal between the slug and the second number of wetting pads is then operable to maintain a coupling between the second number of wetting pads and the slug which also maintains the reflective surface.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
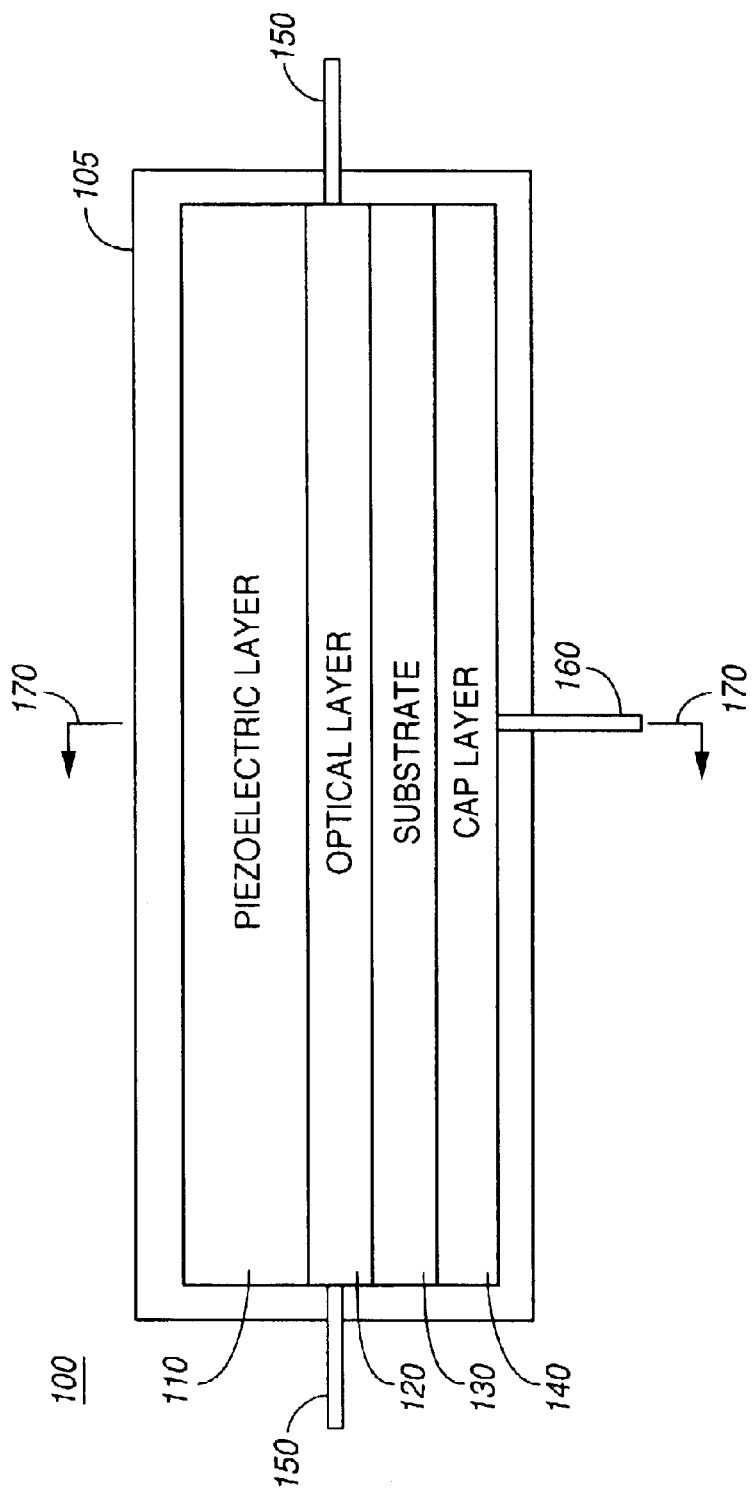
FIG. 1 is a side view of a liquid metal reflective optical switch, according to certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

A liquid metal reflective optical switch may be represented using a plurality of layers, wherein the plurality of layers represent layers created during a fabrication of the liquid metal reflective optical switch. Referring now to FIG. 1, a side view 100 of a liquid metal reflective optical switch 105 is shown, according to a certain embodiment of the present invention. Piezoelectric layer 110 is coupled to first plurality of optical waveguides 150, wherein first plurality of optical waveguides 150 is further coupled to optical layer 120. Optical layer 120 is coupled to wetting pad substrate 130, and wetting pad substrate 130 is coupled to cap layer 140. It is noted that circuit substrate layer 130 may further comprise a plurality of circuit traces, wherein the plurality of circuit traces are not shown in FIG. 1. It is further noted that additional layers may be coupled to cap layer 140, piezoelectric layer 110 and circuit substrate layer 130 without departing from the spirit and scope of the present invention. In certain embodiments of the present invention, piezoelectric layer 110 may be coupled to optical layer 120 and optical waveguide 130. In a certain embodiment of the present invention, the piezoelectric layer 110, optical layer 120, wetting pad substrate layer 130, and cap layer 140 may be combined, further expanded or otherwise reorganized without departing from the spirit and scope of the present invention. A second plurality of optical waveguides 160 is coupled to piezoelectric layer 110, optical layer 120, wetting pad substrate layer 130, and cap layer 140. In certain embodiments of the present invention, the first plurality of optical waveguides 150 is perpendicular to the second plurality of optical waveguides 160. FIG. 1 further illustrates a cross section 170 of liquid metal reflective optical switch 105. In certain embodiments of the present invention, the cap layer 140, optical layer 120, piezoelectric layer 110, and substrate layer 130 may be composed of one or more of glass, ceramic, composite material and ceramic-coated material. It is noted that wetting pad substrate layer 150 may further comprise a plurality of circuit traces, wherein the plurality of circuit traces are not shown in FIG. 1.

Figure 2:
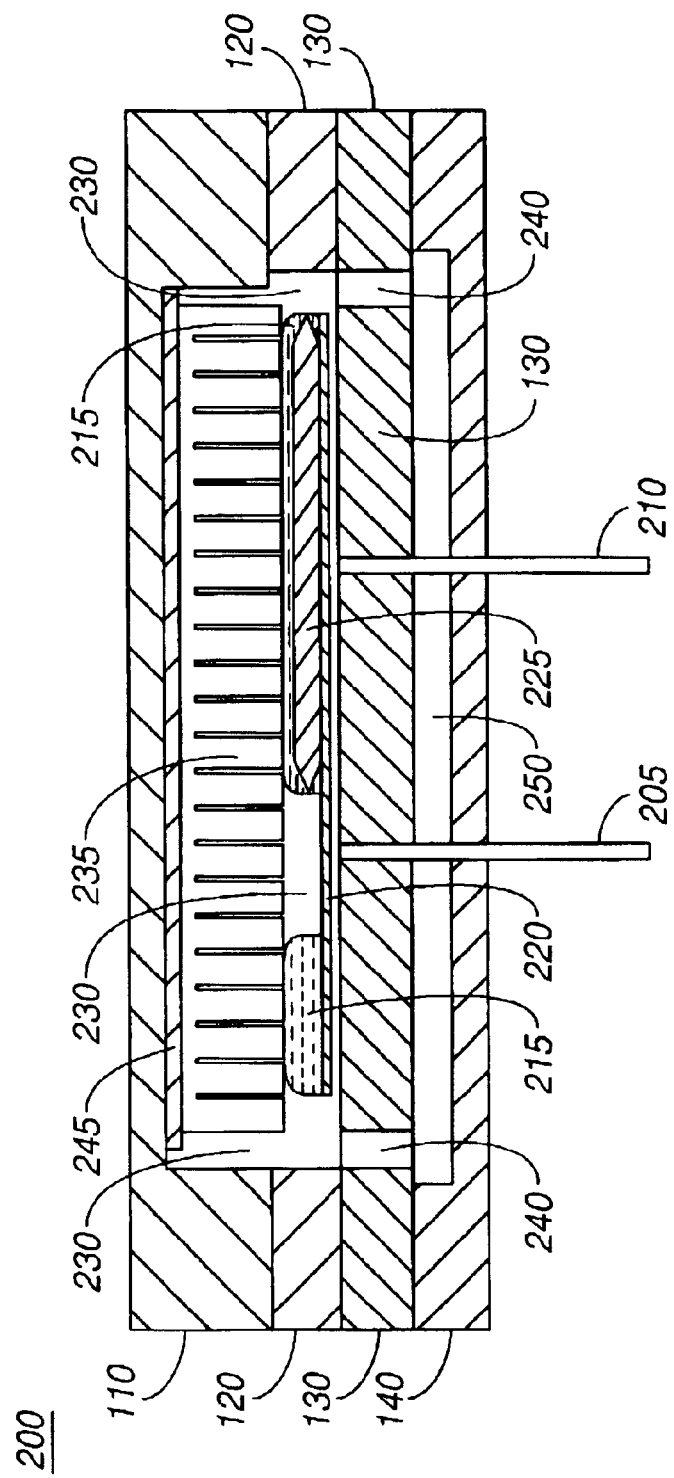
FIG. 2 is a cross section of a liquid metal reflective optical switch, according to certain embodiments of the present invention.

Referring now to FIG. 2, a cross section 200 of liquid metal reflective optical switch 105 is shown, according certain embodiments of the present invention. Cross-section 200 is substantially equivalent to cross section 170. First plurality of optical waveguides 150 are oriented perpendicular to the cross-section 200. Piezoelectric layer 110 is coupled to a conductive adhesive 245. Conductive adhesive 245 is further coupled to a plurality of piezoelectric elements 235. It is noted that plurality of piezoelectric elements 235 may be directly coupled to piezoelectric layer 110. A chamber 230 resides within optical layer 120, and said chamber 230 is coupled to plurality of piezoelectric elements 235 and further coupled to wetting pad substrate layer 130. Chamber 230 further comprises a plurality of wetting pads 220, wherein said plurality of wetting pads 220 are coupled to wetting pad substrate layer 130. A liquid metal 215, such as Mercury, resides within chamber 230 and is operable to wet plurality of wetting pads 220. The liquid metal 215, such as mercury or a Gallium alloy, acts as a friction-reducing lubricant. Chamber 230 further comprises slug 225, wherein slug 225 is coupled to one or more of the plurality of wetting pads 220. In certain embodiments of the present invention slug 225 is composed of a solid material. It is further noted that in certain embodiments of the present invention, slug 225 may be coupled with one or more of the plurality of wetting pads 220 at all times. In certain embodiments of the present invention slug 225 is surrounded by liquid metal 215. Slug 225 may be hollow or solid, composed of a wettable material such as metal, ceramic or plastic, and in certain embodiments of the present invention, slug 225 may have tapered ends to facilitate a contact between slug 225 and plurality of piezoelectric elements 235. The slug 225 is wettable and so may be maintained in a stable position due to the surface tension of the liquid metal 215 and the coupling of the slug 225 to one or more of the plurality of switch contacts wetting pads 220.

Chamber 230 is filled with a gas, which in certain embodiments of the present invention is inert. In a certain embodiment of the present invention, the gas is Nitrogen. Slug 225 is represented in FIG. 2 as a solid material, although it is noted that slug 225 may be hollow without departing from the spirit and scope of the present invention. In a certain embodiment of the present invention, slug 225 is tapered at both longitudinal ends of said slug 225 so that slug 225 may be actuated by a movement of a piezoelectric element of the plurality of piezoelectric elements 235. The piezoelectric elements 235 may be independently actuated and are constrained on one end so that the actuation occurs in the direction of the cap layer 140. The piezoelectric element may be composed from ceramic, quartz, plastic, or specially designed materials. It is also noted that although liquid metal reflective optical switch 105 is shown with three wetting pads 220, a greater number of metal wetting pads may be used without departing from the spirit and scope of the present invention. The plurality of wetting pads 220 are chosen from a material so that plurality of wetting pads 220 does not interact with liquid metal 215. It is noted that in a certain embodiment of the present invention, one or more of plurality of wetting pads 220 are coupled to slug 225 at each time instant thereby enabling liquid metal switch 105 to switch one or more optical signals in a differential manner.

As shown in FIG. 2, wetting pad substrate layer 130 comprises one or more vias 240 coupled to chamber 230. The one or more vias 240 are further coupled to channel 250, wherein channel 250 is coupled to cap layer 140. In certain embodiments of the present invention, channel 250 resides within cap layer 140. Channel 250 is operable to substantially equalize a pressure within chamber 230. Although two vias representative of one or more vias 240 are shown in FIG. 2, more than two vias could be used without departing from the spirit and scope of the present invention. Second plurality of optical waveguides 160 are represented as first optical waveguide 205 and second optical waveguide 210, wherein first optical waveguide 205 and second optical waveguide 210 are coupled to cap layer 140, channel 250, wetting pad substrate layer 130 prior to being coupled to chamber 230.

Figure 3:
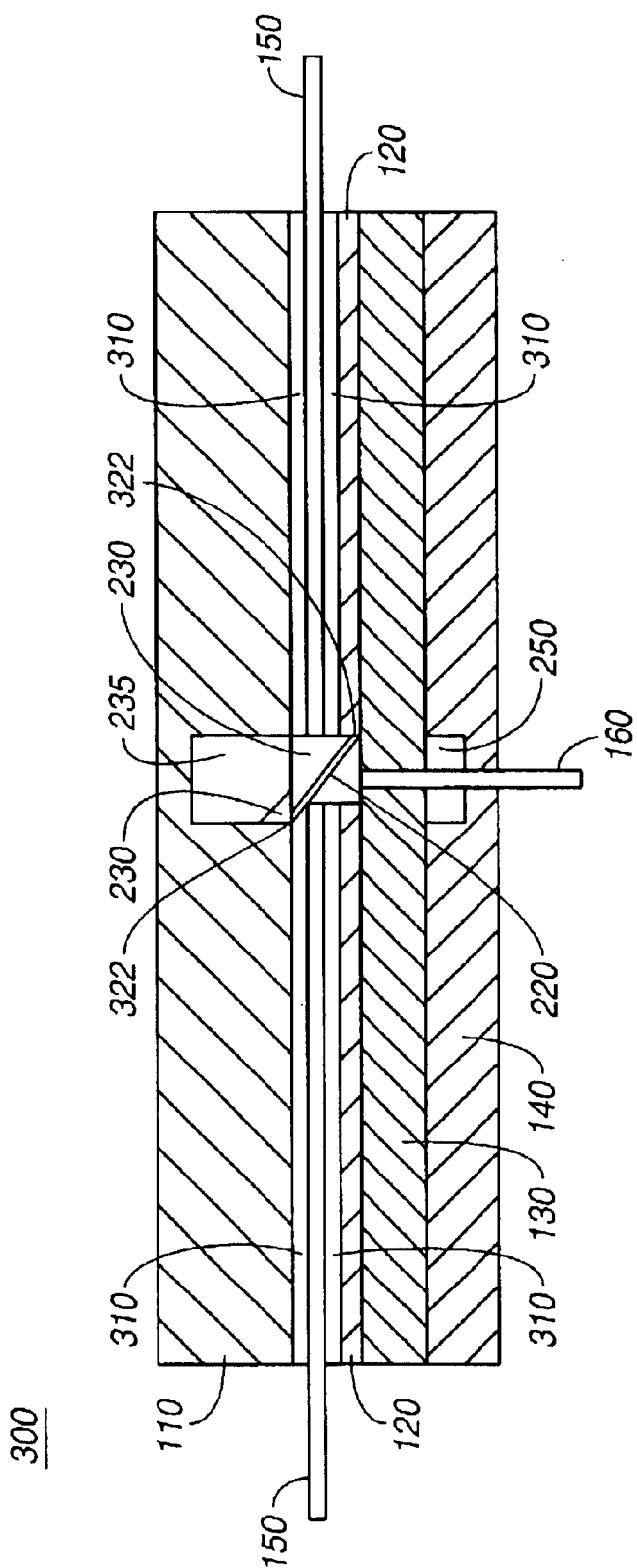
FIG. 3 is a second side view of a liquid metal reflective optical switch, according to certain embodiments of the present invention.

Referring now to FIG. 3 a second side view 300 of liquid metal reflective optical switch 105 is shown, according to certain embodiments of the present invention. The second side view illustrates an orientation of first plurality of optical waveguides 150 and second plurality of optical waveguides 160 relative to plurality of piezoelectric elements 235, chamber 230 and plurality of wetting pads 220. First plurality of optical waveguides 150 is coupled to chamber 230 and plurality of wetting pads 220, and one or more optical signals carried by first plurality of optical waveguides 150 may be deflected by motion of slug 225. Encapsulant 310 is coupled to first plurality of optical waveguides 150 and further coupled to optical layer 120 and piezoelectric layer 110. In certain embodiments of the present invention, encapsulant 310 is operable to provide stability for first plurality of optical waveguides 150. In certain embodiments of the present invention, encapsulant 310 is composed of an inert, mechanically stable, quick-setting adhesive such as a UV curable epoxy or acrylic.

As illustrated in FIG. 3, the plurality of wetting pads 220 are oriented at a 45 degree angle relative to first plurality of optical waveguides 150 and second plurality of optical waveguides 160. It is noted that angles other than 45 degrees could be used. It is noted that the second side view 300 further illustrates a shape of plurality of piezoelectric elements 235. The shape of plurality of piezoelectric elements 235 has a triangular notch in the lower left portion of the plurality of piezoelectric elements 235, wherein the triangular notch has a geometry that enables the plurality of piezoelectric elements 235 to extend without contacting plurality of wetting pads 220. The plurality of wetting pads 220 are oriented so that a signal may be coupled between a first waveguide of first plurality of waveguides 150 and a second waveguide of second plurality of waveguides 160. In certain embodiments of the present invention, the plurality of wetting pads 220 forms a same angle between the first plurality of optical waveguides 150 and the second plurality of optical waveguides 160. This may be observed as a special case of an angle of incidence equaling the angle of reflection. The plurality of wetting pads 220 further comprises a plurality of ridges 322, wherein the plurality of ridges are operable to enable a creation of a planar reflective coating on plurality of wetting pads 220.

Figure 4:
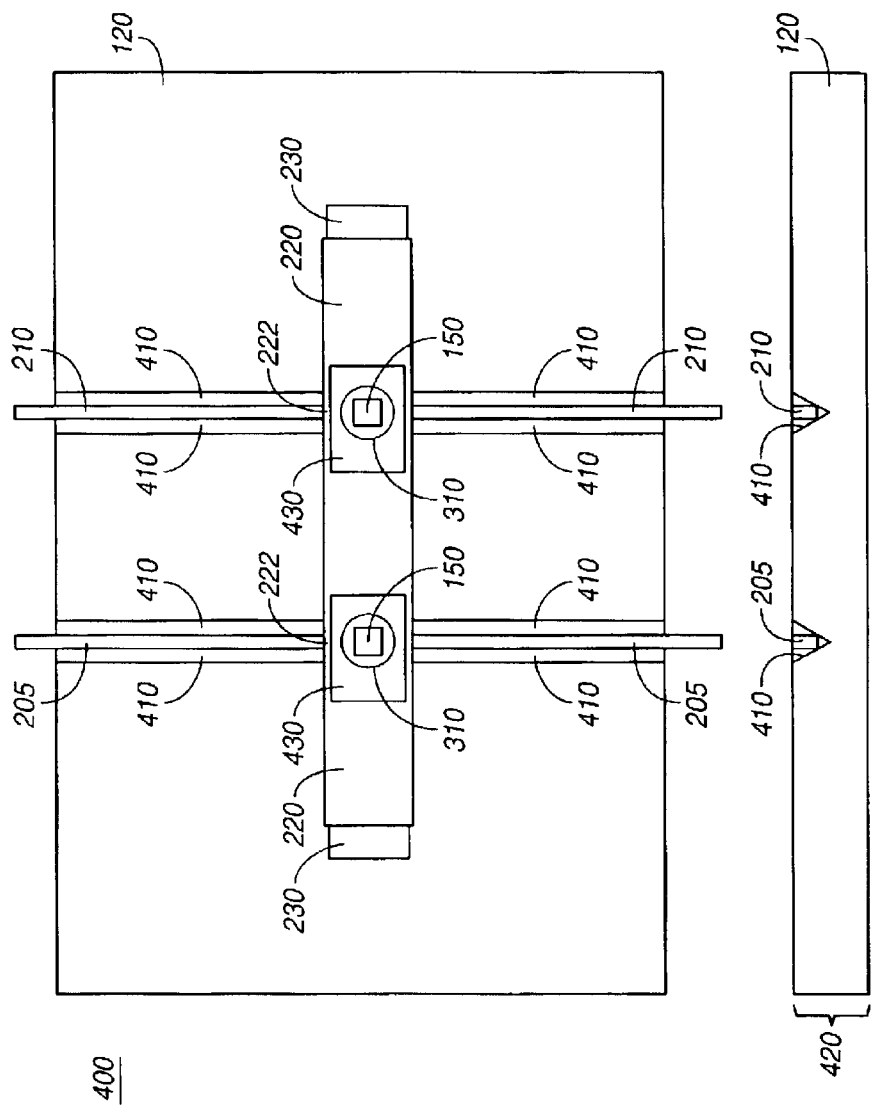
FIG. 4 is a top view of a liquid metal reflective optical switch with a cap layer and a via layer removed, according to certain embodiments of the present invention.

Referring now to FIG. 4 a top view 400 of liquid metal reflective optical switch 105 with cap layer 140 and wetting pad substrate layer 130 removed is shown, according to certain embodiments of the present invention. Slug 225 is also not shown. FIG. 4 illustrates how in certain embodiments of the present invention, plurality of wetting pads 220 are part of a single piece of material wherein the signal piece of material has a plurality of openings that enable the first plurality of optical waveguides 150 and the second plurality of optical waveguides 160 to pass through a plane of the plurality of wetting pads 220. In certain embodiments of the present invention, the plurality of openings are formed from a transparent material thereby allowing the liquid metal to latch to the pads 220 and form reflective mirrors by wetting to wettable metal 222 when the slug 225 is coupled to wettable metal 222. In certain embodiments of the present invention, the transparent material supplies mechanical support for the slug 225 and liquid metal 215. In certain embodiments of the present invention, the plurality of wetting pads 220 have a longitudinal extent that is smaller than the length of chamber 230. FIG. 4 further illustrates a sectional view 420 of top view 400. Sectional view 420 illustrates how first plurality of optical waveguides 150, represented by first optical waveguide 205 and second optical waveguide 210 are seated in a triangular trough of optical layer 120. The triangular trough is coupled to encapsulant 410, while encapsulant 410 is further coupled to first optical waveguide 205 and second optical waveguide 210.

Figure 5:
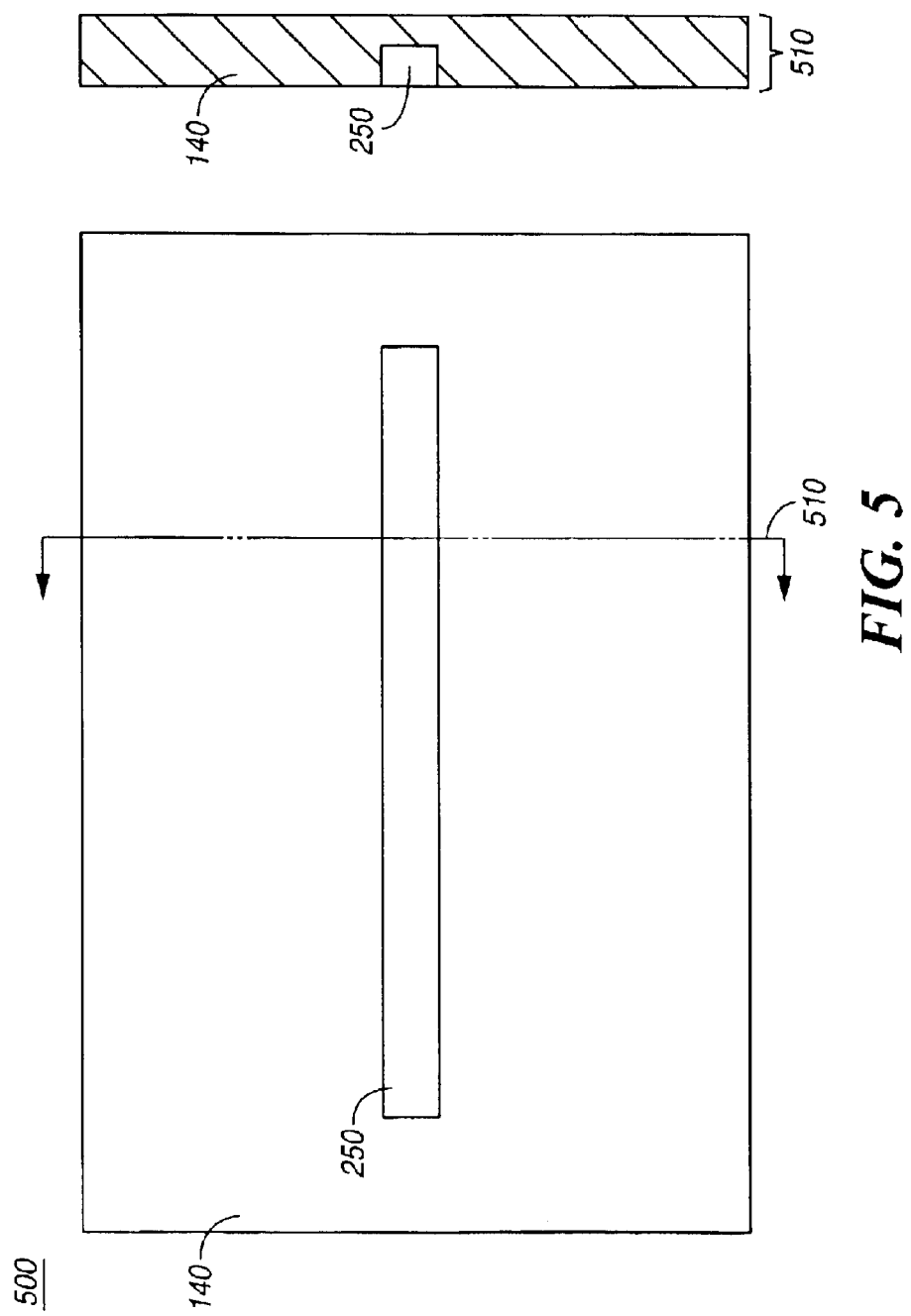
FIG. 5 is a top view of a cap layer of a liquid metal reflective optical switch, according to certain embodiments of the present invention.

Referring now to FIG. 5 a top view 500 of cap layer 140 of liquid metal reflective optical switch 105 is shown, according to certain embodiments of the present invention. Sectional view 510 is also shown to illustrate an extent of channel 250 coupling to cap layer 140. Channel 250 is operable to equalize a pressure of chamber 230, wherein said pressure change is caused by a motion of slug 225. As slug 225 moves, vias 205 and 210 enable a substantially equivalent pressure on a left side of slug 225 and a right side of slug 225.

Figure 6:
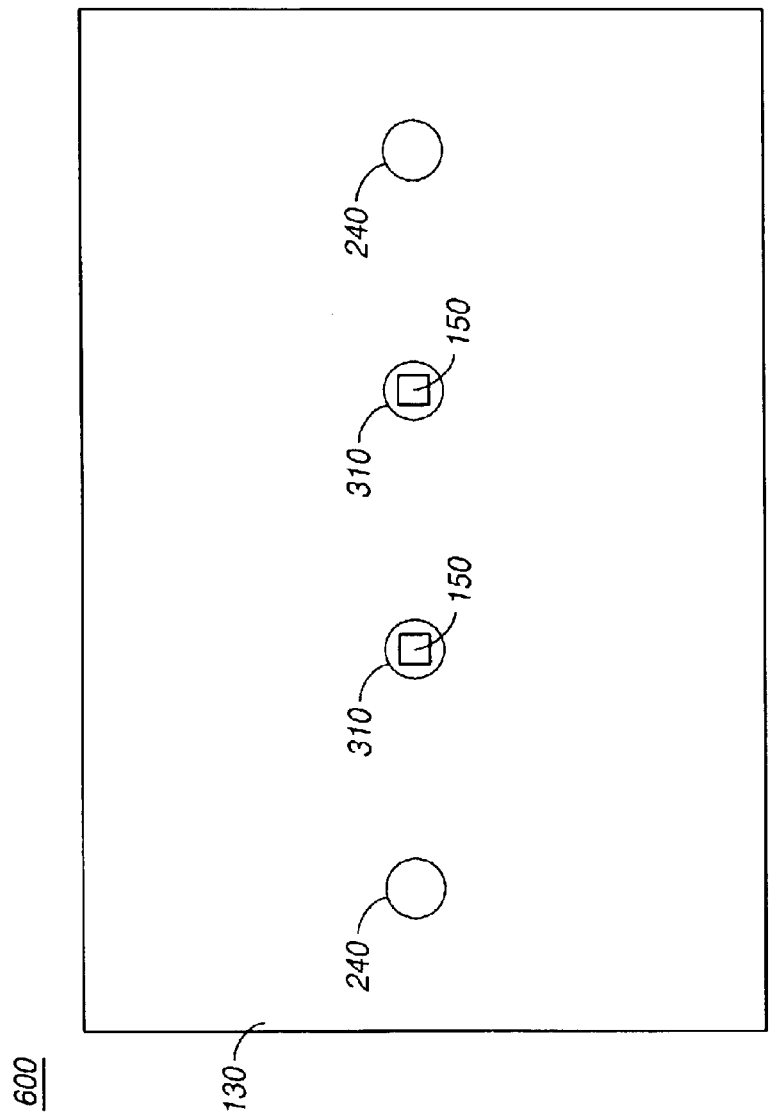
FIG. 6 is a top view of a wetting pad substrate layer of a liquid metal reflective optical switch, according to certain embodiments of the present invention.

Referring now to FIG. 6 a top view 600 of wetting pad substrate layer 130 of liquid metal reflective optical switch 105 is shown, according to certain embodiments of the present invention. FIG. 6 illustrates an orientation of plurality of vias 240 relative to first plurality of optical waveguides 150 and encapsulant 310. It is noted that although plurality of vias 240 have a circular cross-section and an orifice of first plurality of optical waveguides 150 have a square cross-section, other geometric cross-sections could be used without departing from the spirit and scope of the present invention.

Figure 7:
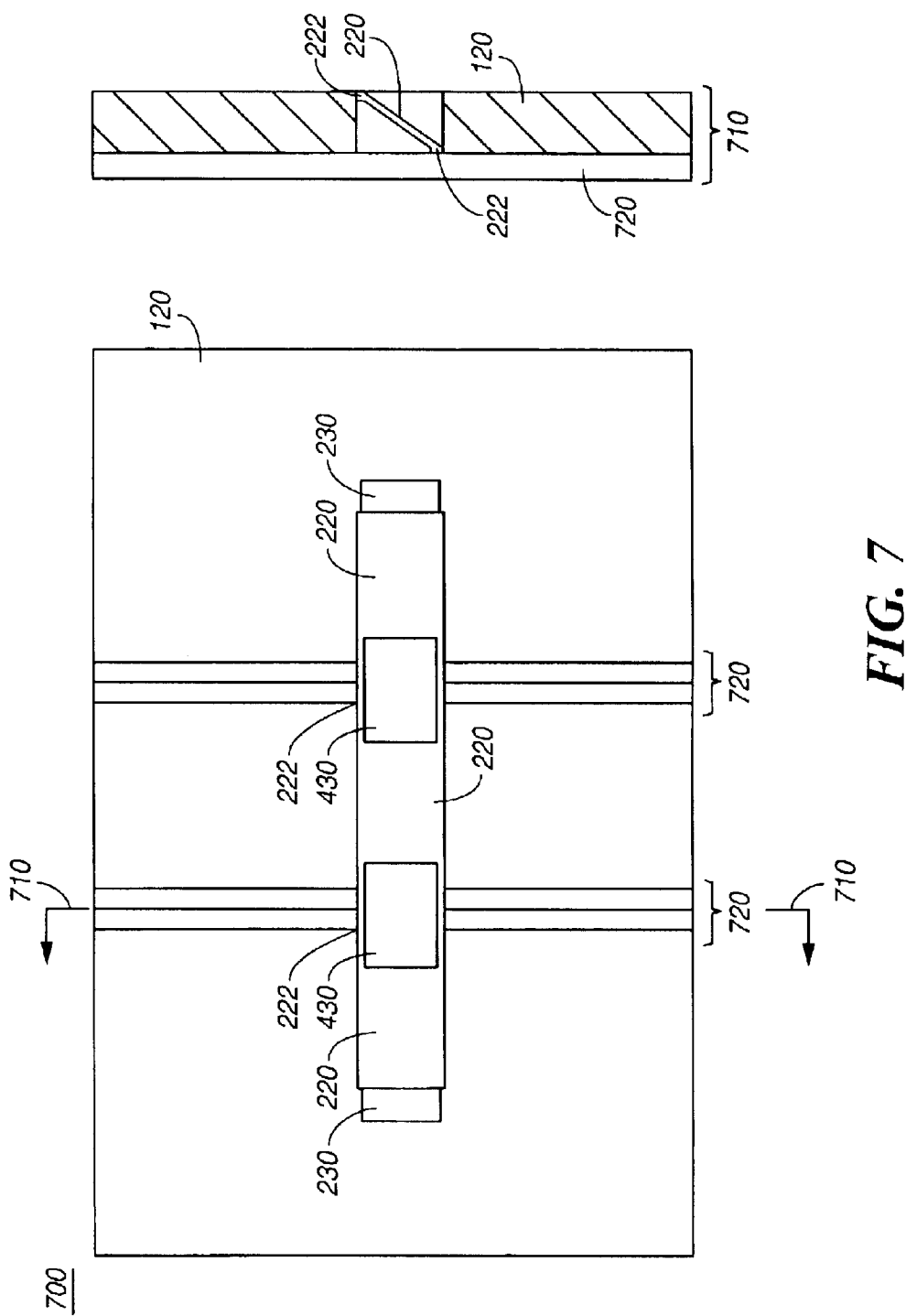
FIG. 7 is a top view of an optical layer of a liquid metal reflective optical switch, according to certain embodiments of the present invention.

Referring now to FIG. 7 a top view 700 of optical layer 120 of liquid metal reflective optical switch 105 is shown, according to certain embodiments of the present invention. FIG. 7 also illustrates a top view of optical waveguide holders 720 and a side view 710 of optical waveguide holders 720. Optical waveguide holders 720 are operable to be coupled to first optical waveguide 205 and second optical waveguide 210. It is noted that in certain embodiments of the present invention, optical waveguide holders 720 are contained within optical layer 120. The plurality of ridges 222 are also shown in FIG. 7 in relation to optical waveguide holders 720.

Figure 8:
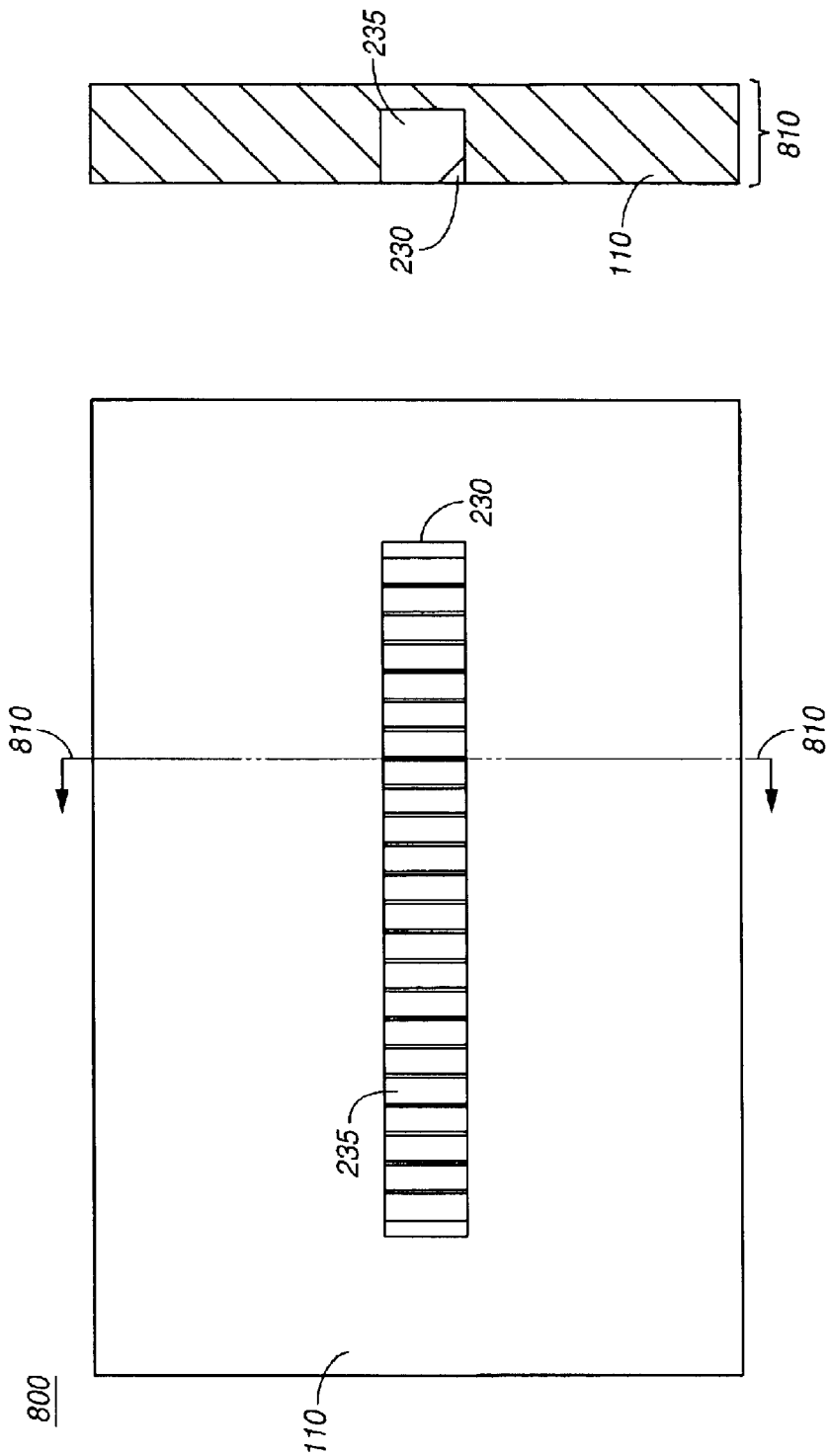
FIG. 8 is a top view of a piezoelectric layer of a liquid metal reflective optical switch, according to certain embodiments of the present invention.

Referring now to FIG. 8 a top view 800 of piezoelectric layer 110 of liquid metal reflective optical switch 105 is shown, according to certain embodiments of the present invention. FIG. 8 illustrates a top view of plurality of piezoelectric elements 235 and a section view 810 of plurality of piezoelectric elements 235. In certain embodiments of the present invention, plurality of piezoelectric elements 235 reside entirely within piezoelectric layer 110 when plurality of piezoelectric elements 235 are not actuated. Side view 810 further illustrates the shape of plurality of piezoelectric elements 235 including the triangular notch first illustrated in FIG. 3.

Figure 9:
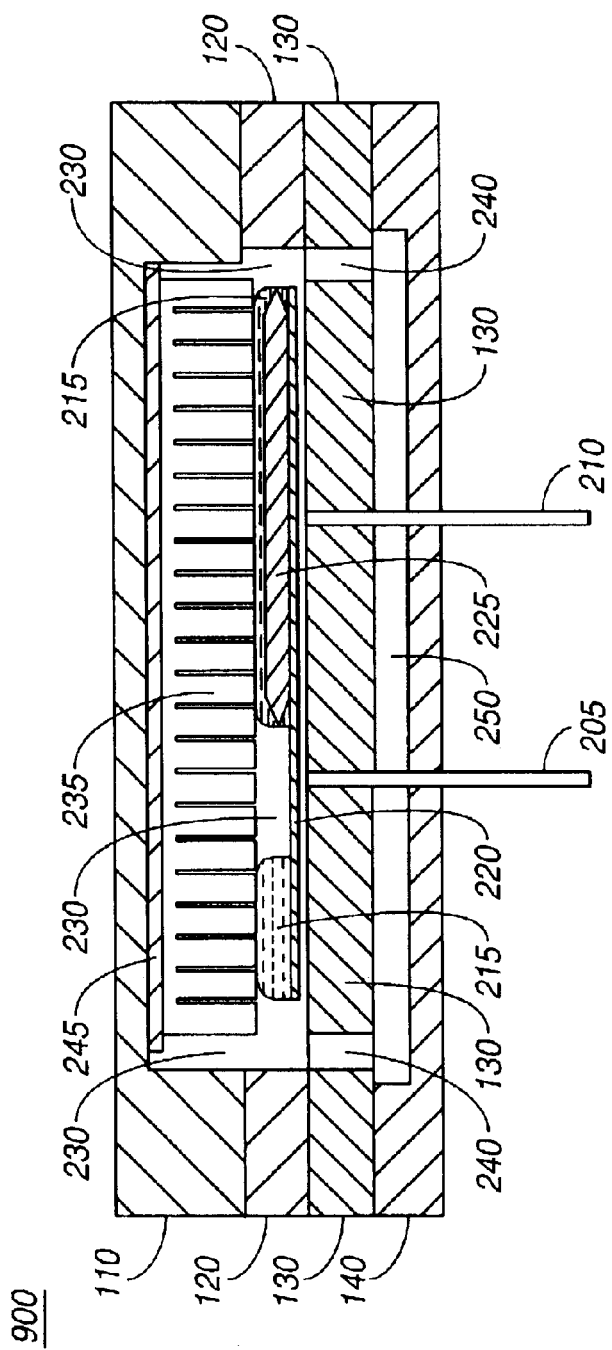
FIG. 9 is a cross section of an initial state of an actuation sequence of a liquid metal reflective optical switch, according to certain embodiments of the present invention.
Figure 10:
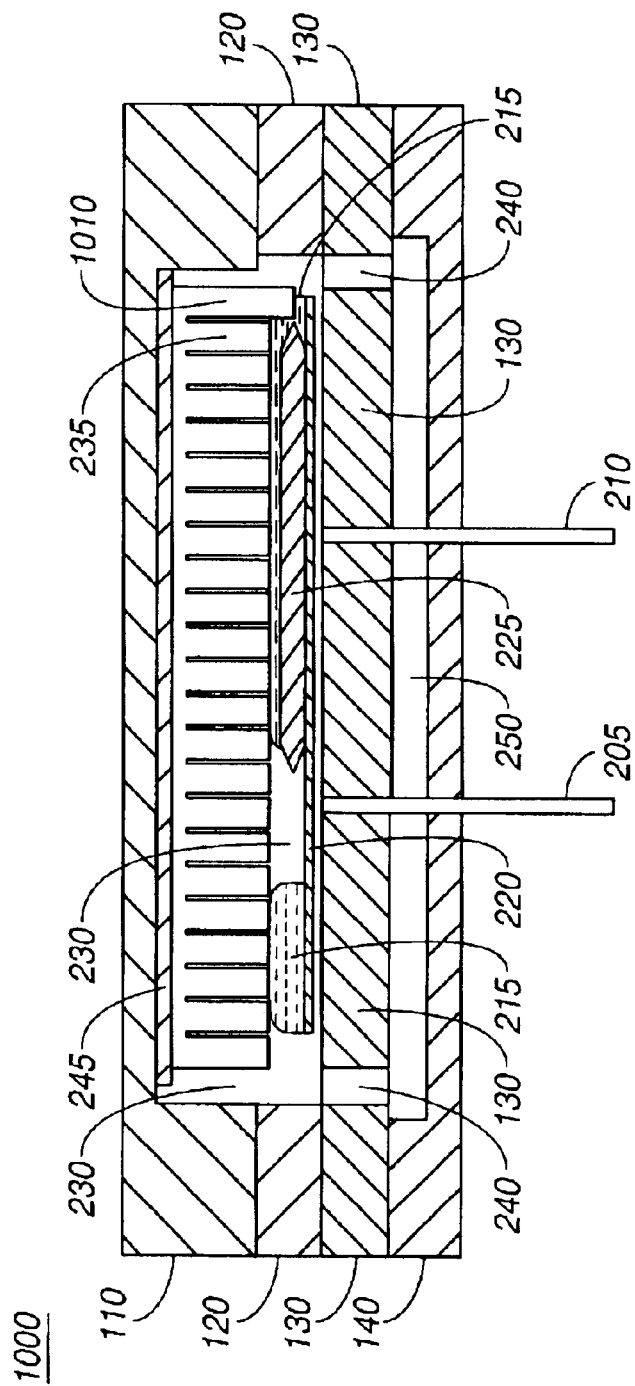
FIG. 10 is a cross section of a first step of an actuation sequence of a liquid metal reflective optical switch, according to certain embodiments of the present invention.
Figure 11:
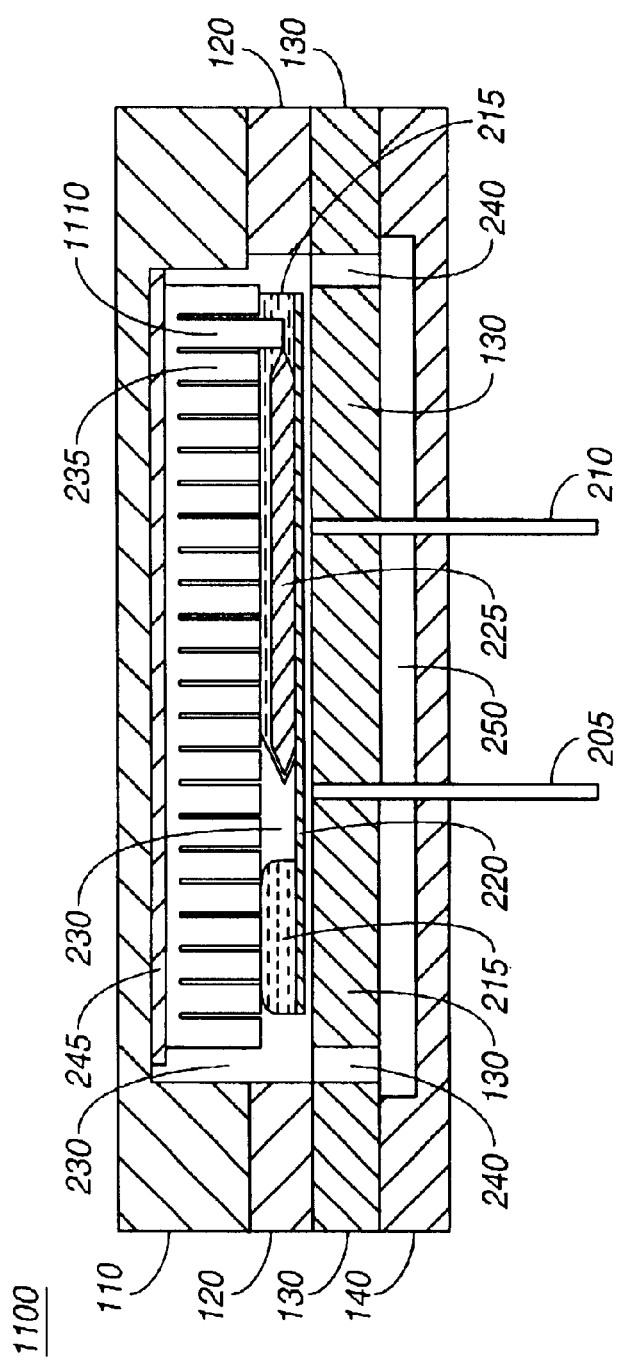
FIG. 11 is a cross section of a second step of an actuation sequence of a liquid metal reflective optical switch, according to certain embodiments of the present invention.
Figure 12:
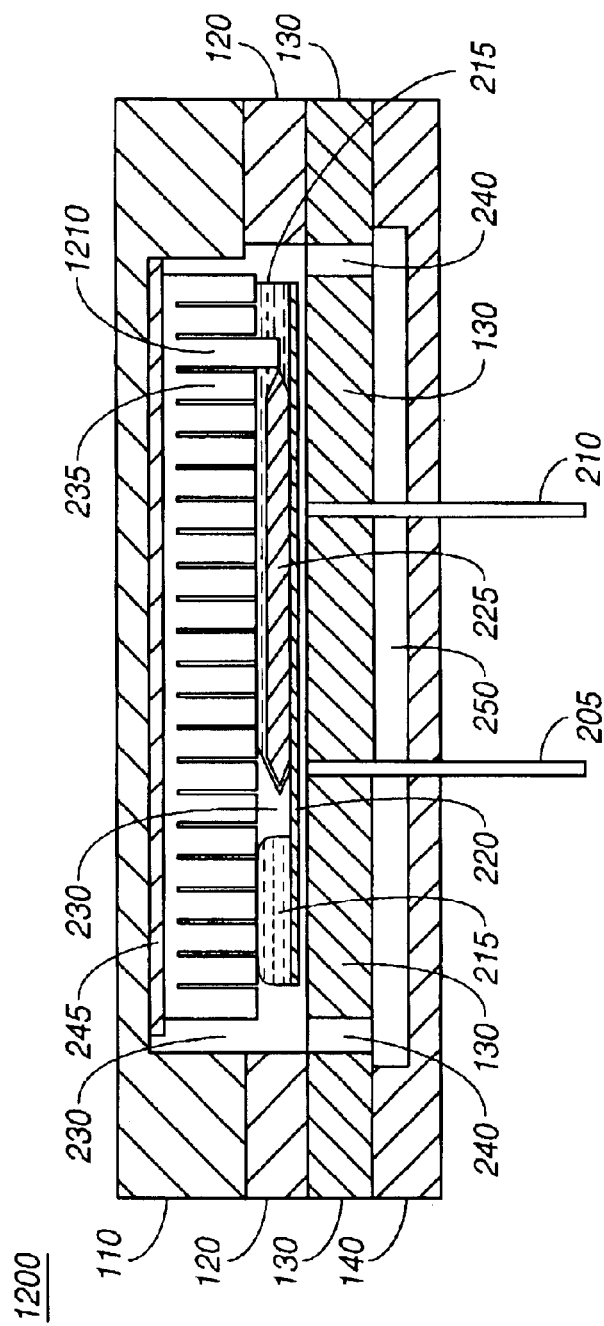
FIG. 12 is a cross section of a third step of an actuation sequence of a liquid metal reflective optical switch, according to certain embodiments of the present invention.
Figure 13:
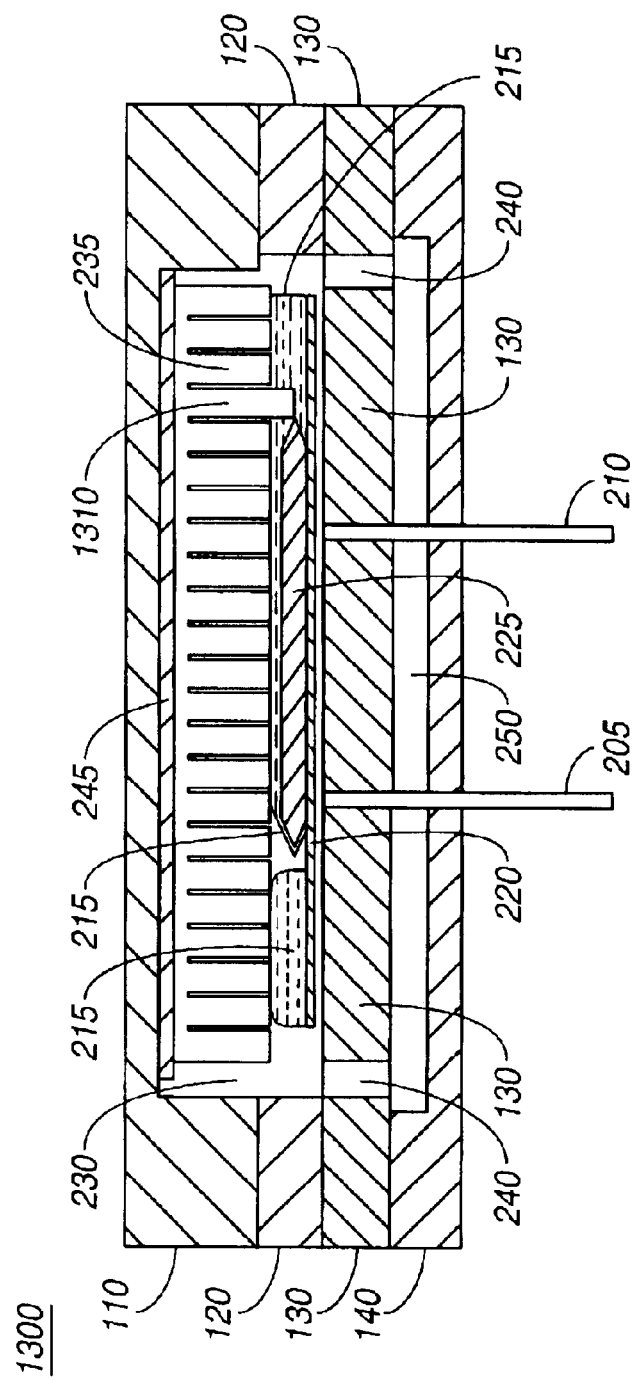
FIG. 13 is a cross section of a fourth step of an actuation sequence of a liquid metal reflective optical switch, according to certain embodiments of the present invention.
Figure 14:
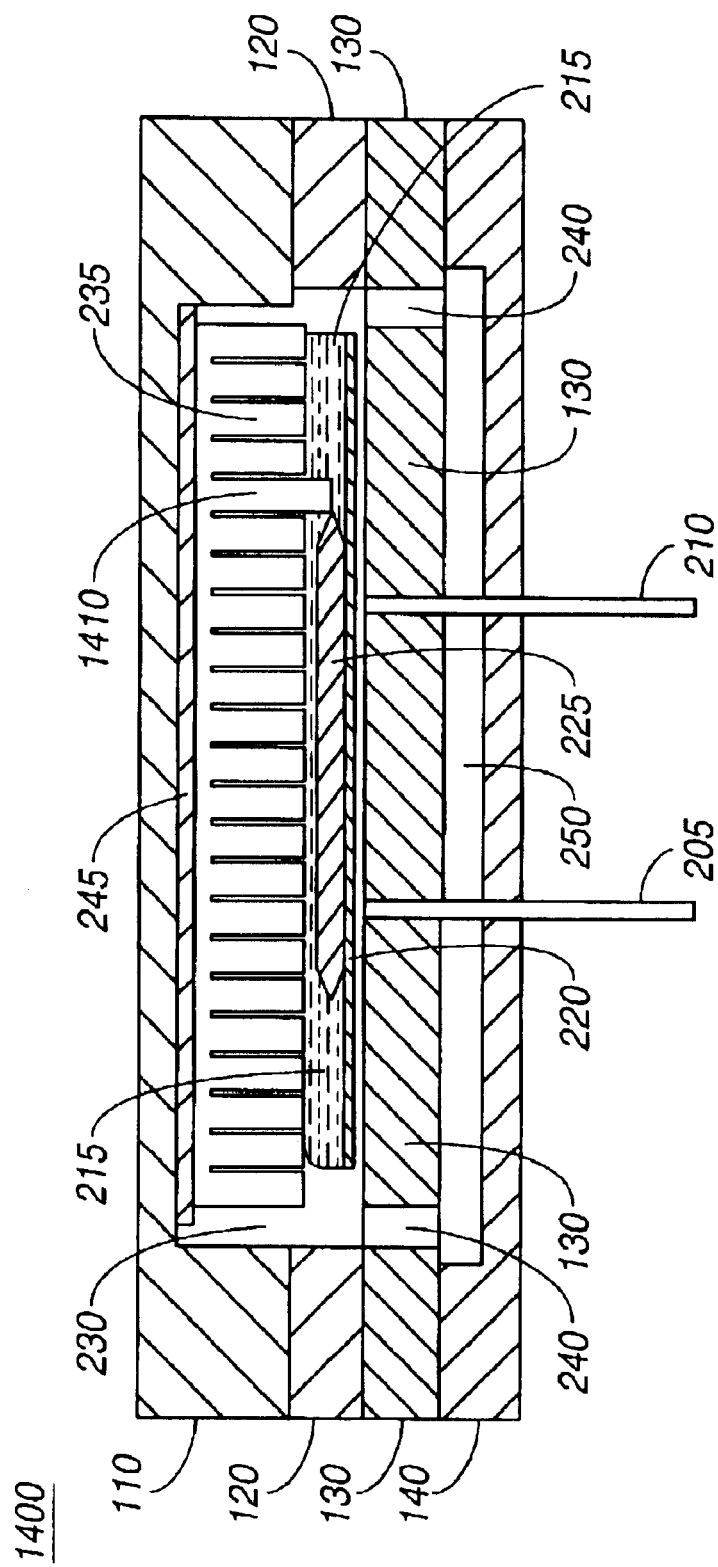
FIG. 14 is a cross section of a fifth step of an actuation sequence of a liquid metal reflective optical switch, according to certain embodiments of the present invention.
Figure 15:
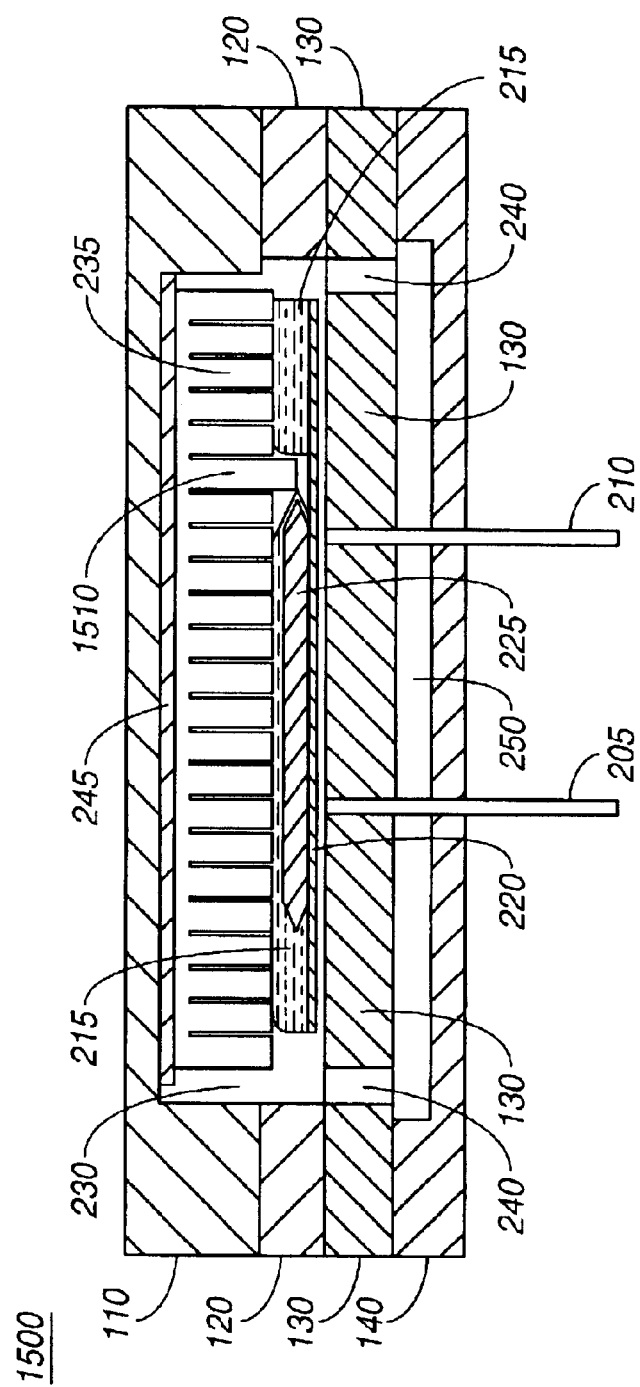
FIG. 15 is a cross section of a sixth step of an actuation sequence of a liquid metal reflective optical switch, according to certain embodiments of the present invention.
Figure 16:
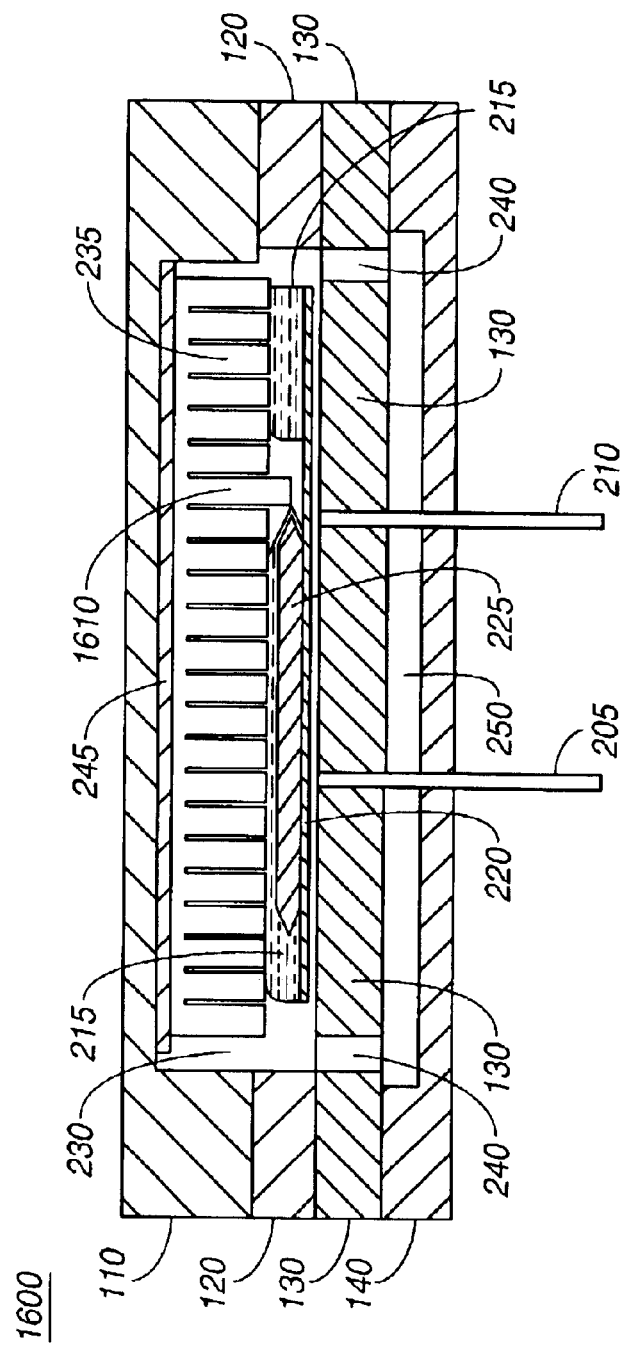
FIG. 16 is a cross section of a seventh step of an actuation sequence of a liquid metal reflective optical switch, according to certain embodiments of the present invention.
Figure 17:
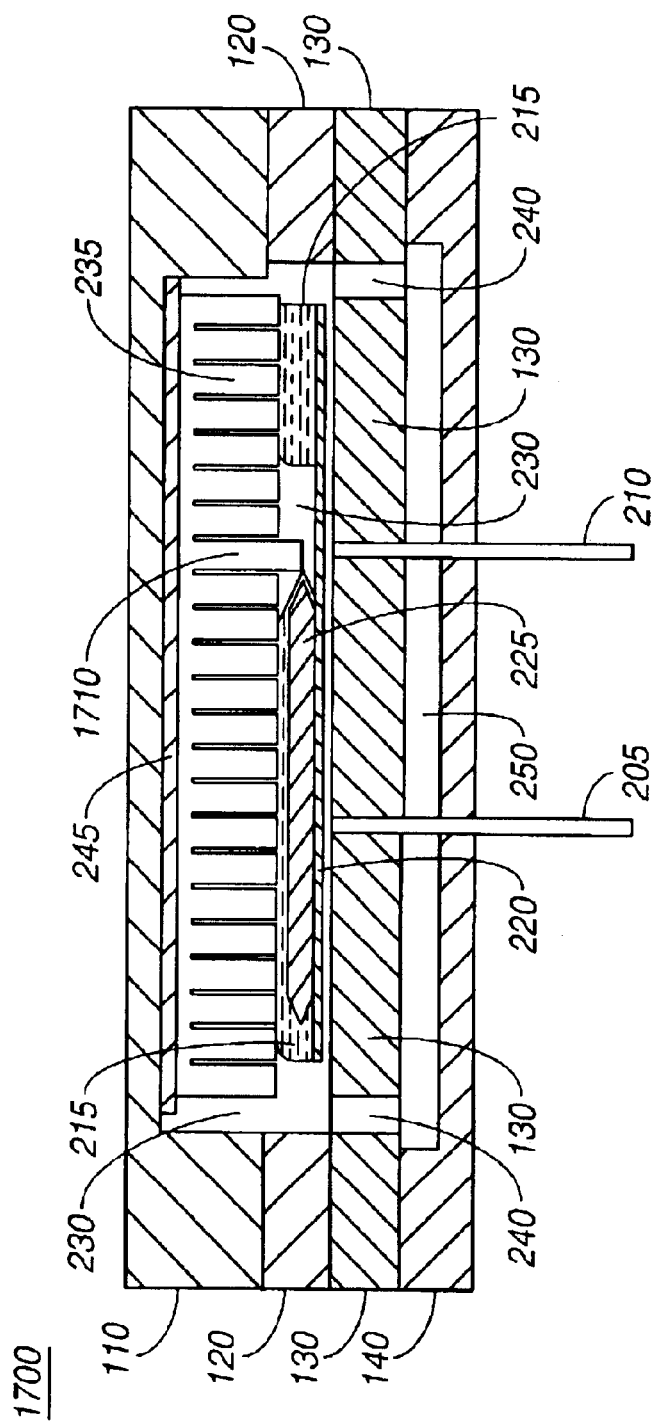
FIG. 17 is a cross section of an eighth step of an actuation sequence of a liquid metal reflective optical switch, according to certain embodiments of the present invention.
Figure 18:
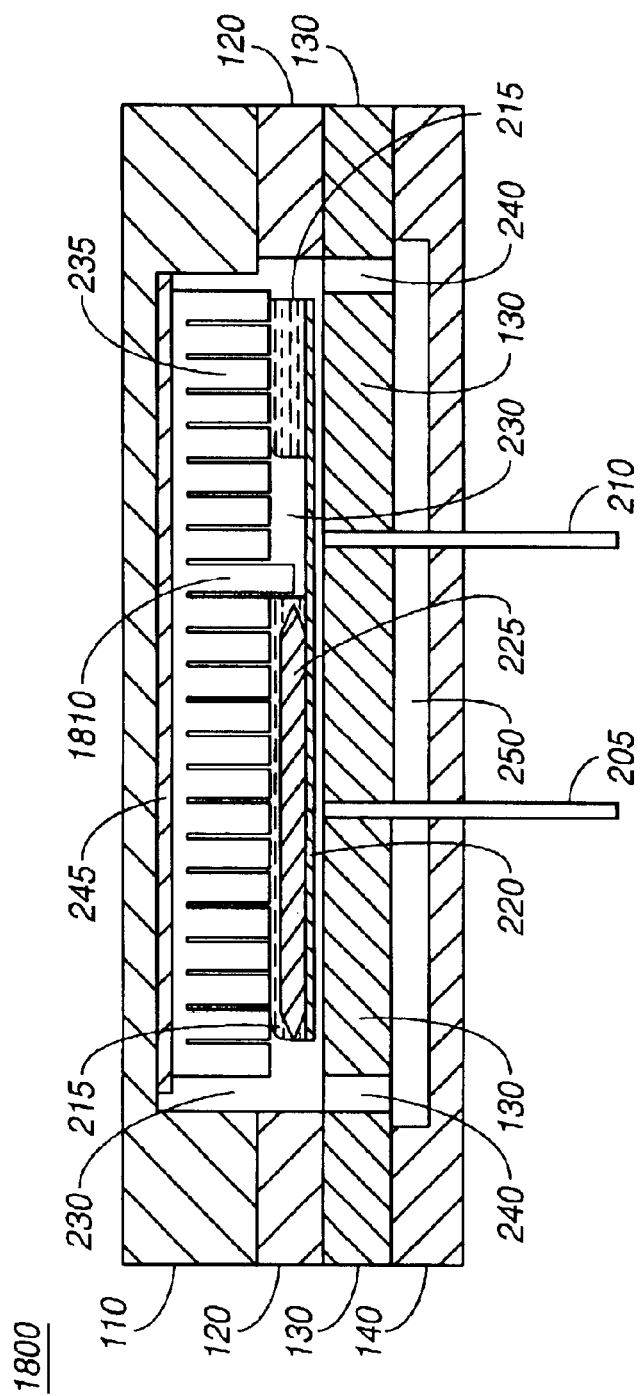
FIG. 18 is a cross section of a ninth step of an actuation sequence of a liquid metal reflective optical switch, according to certain embodiments of the present invention.

Referring now to FIG. 9 a cross section of an initial state 900 of an actuation sequence of liquid metal reflective optical switch 105 is shown, according to certain embodiments of the present invention. The actuation sequence, which is shown in a plurality of steps in FIG. 10 through FIG. 18, illustrates a movement of slug 225 from a first side of the chamber 230 of liquid metal reflective optical switch 105 to a second side. During the initial state, first optical waveguide 205 is unblocked, while second optical waveguide 210 is blocked by slug 225. The slug 225 is wetted by liquid metal 215 so that a signal of second optical waveguide 210 is reflected by a reflective coating due to liquid metal 215. The signal of second optical waveguide 150 is operable to be coupled to an optical waveguide of second plurality of optical waveguides 210 after being reflected by the reflective coating. Slug 225 is moved by actuation of successive elements (1010,1110,1210, 1310, 1410, 1510,1610, 1710,1810) of plurality of piezoelectric elements 235.

Figure 19:
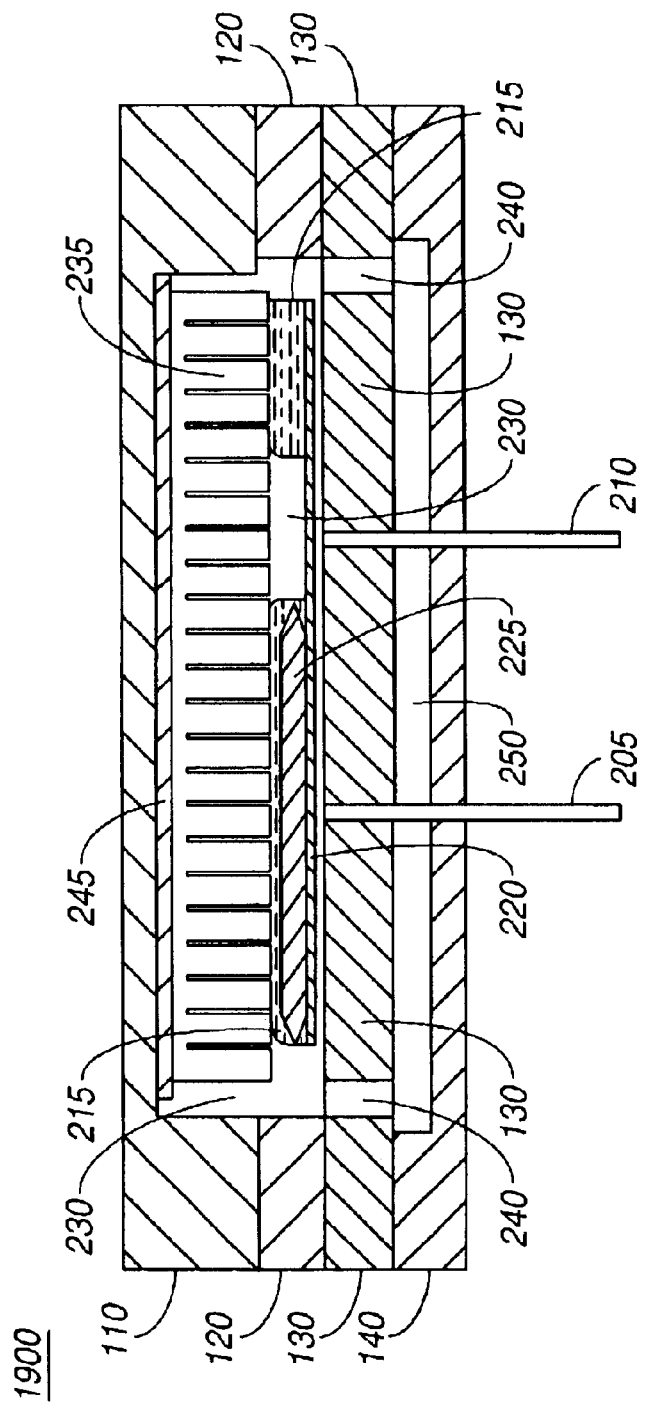
FIG. 19 is a cross section of a final state of an actuation sequence of a liquid metal reflective optical switch, according to certain embodiments of the present invention.

Referring now to FIG. 19 a cross section of a final state of the actuation sequence of liquid metal reflective optical switch 105 is shown, according to certain embodiments of the present invention. In the final state, slug 225 has moved from the first side to the second side of chamber 230. The slug 225 is wetted by liquid metal 215 so that a signal of first optical waveguide 150 is reflected by a reflective coating due to liquid metal 215. The signal of first optical waveguide 150 is operable to be coupled to a second optical waveguide of second plurality of optical waveguides 205 after being reflected by the reflective coating. It is noted that although successive actuations are shown in FIGS. 10–18, other sequences of actuation, such as actuating every other piezoelectric element of plurality of piezoelectric elements 235, could be used without departing from the spirit and scope of the present invention.

The liquid metal reflective optical switch 105 operates by means of the lateral displacement of one or more of the plurality of piezoelectric elements 235 in an extension mode thereby displacing slug 225 that is wetted by a liquid metal 215 and causing the liquid metal 215 to wet a portion of the plurality of wetting pads 220. The wetting of the plurality of wetting pads 220 in conjunction with plurality of ridges 222 creates a reflective surface operable to route a signal of a third optical waveguide of first plurality of optical waveguides 150 to a fourth optical waveguide of second plurality of optical waveguides 160.

The lateral motions of the plurality of piezoelectric elements 235 squeeze the slug 225 tapered ends, thereby moving the slug 225 along a length of the chamber 230 to overcome surface tension forces that would constrain the slug 225. The liquid metal reflective optical switch 105 latches by means of a surface tension due to the liquid metal 215 wetting slug 225 to the plurality of wetting pads 220.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A structure for a reflective optical switch, comprising:
   a gas-filled chamber housed within a solid material;
   a first one or more optical waveguides coupled to the gas-filled chamber wherein the first one or more optical waveguides are parallel to a longitudinal axis of the gas-filled chamber;
   a second one or more optical waveguides coupled to the gas-filled chamber wherein the second one or more optical waveguides are not parallel to the first one or more optical waveguides;
   a plurality of piezoelectric elements of the gas-filled chamber, coupled to the solid material;
   a slug within the gas-filled chamber coupled to one or more of the plurality of piezoelectric elements, said slug operable to move along the longitudinal axis of the gas-filled chamber; and
   a liquid metal within the gas-filled chamber, said liquid metal operable to be coupled to the slug wherein the coupling of the liquid metal to the slug and gas-filled chamber is operable to create an optically reflective surface.

2. The structure of claim 1, wherein prior to being coupled to the solid material, the plurality of piezoelectric elements are coupled to a conductive adhesive.

3. The structure of claim 1, wherein the first one or more optical waveguides and the second one or more optical waveguides are coupled to the solid material using an encapsulant.

4. The structure of claim 1, wherein the plurality of piezoelectric elements are perpendicular to the longitudinal axis of the gas-filled chamber.

5. The structure of claim 1, wherein the chamber is filled with an inert gas.

6. The structure of claim 1, wherein a gas of the gas-filled chamber is nitrogen.

7. The structure of claim 1, wherein the liquid metal is mercury.

8. The structure of claim 1, wherein the slug stays within a volume of the liquid metal during an actuation of one or more of the plurality of piezoelectric elements.

9. The structure of claim 1, wherein the slug is tapered at one or more ends.

10. The structure of claim 1, wherein the plurality of piezoelectric elements are segmented.

11. The structure of claim 1, wherein the gas-filled chamber may be composed of one or more of glass, ceramic, composite material and ceramic-coated material.

12. The structure of claim 1, wherein the plurality of piezoelectric elements are coupled to a common ground.

13. The structure of claim 1, wherein the plurality of piezoelectric elements have a triangular notch removed on a side closest to the first one or more optical waveguides.

14. The structure of claim 1, further comprising one or more vias coupled to the gas-filled chamber, wherein the one or more vias are coupled to a channel.

15. The structure of claim 14, wherein the channel is operable to equalize a first pressure on a first end of the slug and a second pressure on a second end of the slug.

16. The structure of claim 14, wherein the one or more vias are oriented so that the plurality of piezoelectric elements are located between a first via of the one or more vias and a second via of the one or more vias.

17. The structure of claim 1, wherein the chamber further comprises a plurality of wetting pads, said plurality of wetting pads being wettable by the liquid metal.

18. The structure of claim 17, wherein the plurality of wetting pads are coupled to the slug and the liquid metal.

19. The structure of claim 17, wherein the plurality of wetting pads are part of a single piece of material.

20. The structure of claim 17, wherein a face of the plurality of wetting pads forms a first angle with the first one or more optical waveguides that is substantially the same as a second angle with the second one or more optical waveguides.

21. The structure of claim 17, wherein the plurality of wetting pads further comprise an upper ridge and a said lower ridge, said upper ridge and lower ridge operable to create a planar reflective surface using the liquid metal and the slug.

22. The structure of claim 17, wherein the plurality of wetting pads and ridges are formed on a transparent support structure.

23. The structure of claim 17, wherein the slug, the liquid metal and the plurality of wetting pads are operable to create a reflective surface that reflects an optical signal from one or more of the first one or more optical waveguides to one or more of the second one or more optical waveguides.

24. A structure for a reflective optical switch, comprising:
a cap layer comprising a channel;
a substrate layer coupled to the cap layer, said substrate layer comprising one or more vias coupled to the channel;
an optical layer coupled to the substrate layer, said optical layer comprising a chamber coupled to the one or more vias wherein the chamber comprises a slug, liquid metal coupled to the slug, and a plurality of wetting pads operable to be coupled to the slug and coupled to the liquid metal;
a piezoelectric layer coupled to the optical layer, said piezoelectric layer comprising a plurality of piezoelectric elements wherein the plurality of piezoelectric elements are operable to contact the slug;
a first one or more optical waveguides coupled to the cap layer, substrate layer and coupled to the chamber; and
a second one or more optical waveguides coupled to the chamber, wherein the second one or more optical waveguides are not parallel to the first one or more optical waveguides, wherein the slug, the liquid metal and the plurality of wetting pads are operable to create a reflective surface that reflects an optical signal from one or more of the first one or more optical waveguides to one or more of the second one or more optical waveguides.

25. The structure of claim 23, wherein the cap layer, the optical layer, the piezoelectric layer, and the substrate layer are composed of one or more of glass, ceramic, composite material and ceramic-coated material.

26. The structure of claim 23, wherein the substrate layer further comprises a plurality of circuit traces and a plurality of pads operable to route one or more signals generated by actuation of one or more of the plurality of piezoelectric elements.

27. The structure of claim 23, wherein the chamber is filled with an inert gas.

28. The structure of claim 23, wherein the liquid metal is mercury.

29. The structure of claim 23, wherein the slug is tapered at one or more ends.

30. The structure of claim 23, wherein the channel is operable to equalize a first pressure on a first end of the slug and a second pressure on a second end of the slug.

31. The structure of claim 23, wherein the one or more vias are oriented so that the plurality of piezoelectric elements are located between a first via of the one or more vias and a second via of the one or more vias.

32. A method for optical switching of one or more optical signals using a liquid metal reflective optical switch, comprising:
actuating one or more of a plurality of piezoelectric elements;
the actuation of the one or more piezoelectric elements causing a slug coupled to the one or more piezoelectric elements to move from a first number of wetting pads to a second number of wetting pads wherein the first number of wetting pads and the second number of wetting pads are wetted by a liquid metal;
the movement of the slug from the first number of wetting pads to the second number of wetting pads breaking a liquid metal surface tension between the slug and the first number of wetting pads and establishing a coupling between the slug and the second number of wetting pads; and
the coupling between the slug and the second number of wetting pads creating a liquid metal reflective surface operable to reflect an optical signal of the one or more optical signals from a first one or more optical waveguides to a second one or more optical waveguides.

33. The method of claim 31, wherein the slug is wetted by the liquid metal.

34. The method of claim 31, wherein the coupling between the slug and the second number of wetting pads is due to a plurality of surface tension forces caused by the liquid metal.

35. The method of claim 31, wherein one or more of the first number of wetting pads and one or more of the second number of wetting pads are the same.

36. The method of claim 31, wherein actuating one or more of the plurality of piezoelectric elements is operable to reduce a velocity of the slug.

37. The method of claim 31, wherein the plurality of piezoelectric elements are actuated in an adjacent manner.

* * * * *